US009722234B2

(12) United States Patent
Seong et al.

(10) Patent No.: US 9,722,234 B2
(45) Date of Patent: Aug. 1, 2017

(54) SECONDARY BATTERY INCLUDING CAP PLATE COMPRISING REINFORCING ELEMENT

(71) Applicant: Samsung SDI Co., Ltd., Yongin-si, Gyeonggi-do (KR)

(72) Inventors: Jaeil Seong, Yongin-si (KR); Hideaki Yoshio, Yongin-si (KR); Jiwon Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 131 days.

(21) Appl. No.: 14/166,737

(22) Filed: Jan. 28, 2014

(65) Prior Publication Data

US 2015/0111068 A1    Apr. 23, 2015

(30) Foreign Application Priority Data

Oct. 17, 2013    (KR) .................. 10-2013-0124107

(51) Int. Cl.
*H01M 2/34*    (2006.01)
*H01M 2/04*    (2006.01)
*H01M 2/12*    (2006.01)
*H01M 10/04*    (2006.01)

(52) U.S. Cl.
CPC .......... *H01M 2/34* (2013.01); *H01M 2/0404* (2013.01); *H01M 2/0473* (2013.01); *H01M 10/0431* (2013.01); *H01M 10/0436* (2013.01); *H01M 2/0426* (2013.01); *H01M 2/1241* (2013.01)

(58) Field of Classification Search
CPC .... H01M 2/34; H01M 2/0473; H01M 2/0404; H01M 2/0426; H01M 2/1241; H01M 10/0431; H01M 10/0436
See application file for complete search history.

(56) References Cited

U.S. PATENT DOCUMENTS

2005/0266279 A1*  12/2005  Kim .................. H01M 2/12
                                                 429/7
2006/0099494 A1    5/2006  Jung et al.
2009/0186269 A1*  7/2009  Kim .................. H01M 2/043
                                                 429/179
2009/0263703 A1*  10/2009  Kim .................. H01M 2/0404
                                                 429/53

(Continued)

FOREIGN PATENT DOCUMENTS

EP    1 753 053 A1    2/2007
EP    2 551 935 A1    1/2013

(Continued)

OTHER PUBLICATIONS

Machine Translation of: KR 2008/0036742, Seong, Apr. 29, 2008.*

*Primary Examiner* — Kenneth Douyette
(74) *Attorney, Agent, or Firm* — Knobbe Martens Olson & Bear LLP

(57) ABSTRACT

A secondary battery, which can improve safety during a longitudinal compression test by reinforcing strength of a cap plate, is provided. In one embodiment, the secondary battery includes an electrode assembly, a can accommodating the electrode assembly, and cap plate coupled to a top portion of the can and sealing the can, wherein a reinforcement unit is formed on at least one side of the cap plate.

18 Claims, 5 Drawing Sheets

(56) References Cited

U.S. PATENT DOCUMENTS

2012/0208074 A1* 8/2012 Byun .................. H01M 2/0217
                                                               429/175
2012/0237817 A1* 9/2012 Kim ............................ 429/158
2013/0136962 A1    5/2013 Seong et al.

FOREIGN PATENT DOCUMENTS

| EP | 2744013 A1 | 6/2014 |
| KR | 2006-0029750 A | 4/2006 |
| KR | 2007-0101569 A | 10/2007 |
| KR | 2007-0108764 A | 11/2007 |
| KR | 2008-0036742 A | 4/2008 |
| KR | 2009-0048855 A | 5/2009 |
| WO | WO 2013/021939 A1 | 2/2013 |

* cited by examiner

SECONDARY BATTERY INCLUDING CAP PLATE COMPRISING REINFORCING ELEMENT

CROSS-REFERENCE TO RELATED APPLICATIONS

This application claims priority to and the benefit of Korean Patent Application No. 10-2013-0124107, filed on Oct. 17, 2013, the entire content of which is incorporated herein by reference.

BACKGROUND

Field

Aspects of the present invention relate to a secondary battery.

Description of the Related Technology

In general, during a longitudinal compression test of a secondary battery, a force is applied to the center of a can from both sides of the can. The secondary battery can undergo a current discharge while it is bent about the center of the can as a result of a short circuit between a terminal plate and the can. However, during the longitudinal compression test, due to the force applied from both sides of the can, both sides of the cap plate are deformed earlier than other portions of the can before the short circuit between the terminal plate and the can occurs. In that case, since the short circuit between the terminal plate and the can may not occur, there is a risk of ignition and explosion of the secondary battery.

SUMMARY OF CERTAIN INVENTIVE ASPECTS

Aspects of the present invention provide a secondary battery, which can improve safety during a longitudinal compression test by reinforcing strength of a cap plate.

In accordance with one aspect of the present invention, there is provided a secondary battery including an electrode assembly, a can that receives the electrode assembly, and a cap plate coupled to the can so as to seal the electrode assembly with the can, wherein the cap plate defines a longitudinal axis and wherein the cap plate includes at least one reinforcing element that is dimensioned and located on the cap plate so that the can deforms about a first point in response to compressive forces exerted in the direction of the longitudinal axis of the cap plate.

In another embodiment, a weakened portion is formed on the cap plate in a first location so as to define the first point. In another embodiment, the weakened portion comprises a portion of the cap plate of reduced thickness.

In another embodiment, the secondary battery further comprises a terminal plate that is positioned between the cap plate and the can and wherein the first point is selected so that deformation of the cap plate about the first point results in the terminal plate short circuiting with the can.

In another embodiment, the cap plate includes a first and second surface and wherein the reinforcing element comprises at least one groove formed on the cap plate located to one side of the first point along the longitudinal axis of the cap plate. In another embodiment, the at least one groove comprises a first and a second groove located on opposite sides of the first point along the longitudinal axis of the cap plate. In another embodiment, the secondary battery further comprises a protrusion part that is positioned on the surface of the cap plate opposite the groove. In another embodiment, the protrusion part protrudes outward from the surface substantially the same amount as the groove extends into the cap plate and has substantially the same contour as the at least one groove.

In another embodiment, the at least one reinforcing element comprises a first and a second reinforcing element that are arranged on opposite sides of the first point along the longitudinal axis of the cap plate. In another embodiment, the first and second reinforcing elements are symmetrical about the first point.

In another embodiment, a ratio of a horizontal length of the reinforcement element to a horizontal length of the cap plate is between the ratios of 1:2 to 1:20 wherein the horizontal length is in a direction that is parallel to the longitudinal axis.

In another embodiment, a horizontal length of the reinforcement element is 5% to 50% of a horizontal length of the cap plate.

In another embodiment, a ratio of a width of the reinforcement element to a width of the cap plate is between the ratios of 1:2 to 1:20 wherein the width is in a direction that is perpendicular to the longitudinal axis.

In another embodiment, a width of the reinforcement element is 5% to 50% of a width of the cap plate.

In another embodiment, a ratio of the vertical size of the of the reinforcement element to a thickness of the cap plate is between the ratios of 1:1.25 to 1:10.

In another embodiment, the reinforcement element is spaced apart from an end of the cap plate, and a distance between the cap plate and the reinforcement element is 5% to 15% of the horizontal length of the cap plate.

In another embodiment, the secondary battery further comprising a safety vent formed in the can.

In another embodiment, the reinforcing element reinforces the strength of the cap plate by inhibiting at least one side of the cap plate from being deformed due to a force applied from both sides of the can along the longitudinal axis of the cap plate.

In another embodiment, the at least one reinforcement member comprises a protrusion.

In another embodiment, the first point is positioned at approximately the center point of the longitudinal axis of the cap plate.

A safety vent may be formed on a long side surface of the can so as to be ruptured when the gas is generated in the can due to abnormality of the electrode assembly.

A weakened portion having a relatively small strength may be formed on a central region of the cap plate.

The reinforcement unit may reinforce the strength of the cap plate by preventing at least one side of the cap plate from being deformed due to a force applied from both sides of the can during a longitudinal compression test.

As described above, in the secondary battery according to the embodiment of the present invention, a reinforcement unit is formed on one side of the cap plate, thereby preventing an end of the cap plate from being deformed earlier than other portions of the cap plate during a longitudinal compression test. Accordingly, in the secondary battery according to the embodiment of the present invention, a short circuit between a terminal plate and a can is caused during the longitudinal compression test to facilitate a current discharge, thereby improving the safety of the secondary battery.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF CERTAIN INVENTIVE EMBODIMENTS

Hereinafter, examples of embodiments of the invention will be described in detail with reference to the accompanying drawings such that they can easily be made and used by those skilled in the art.

Figure 1:
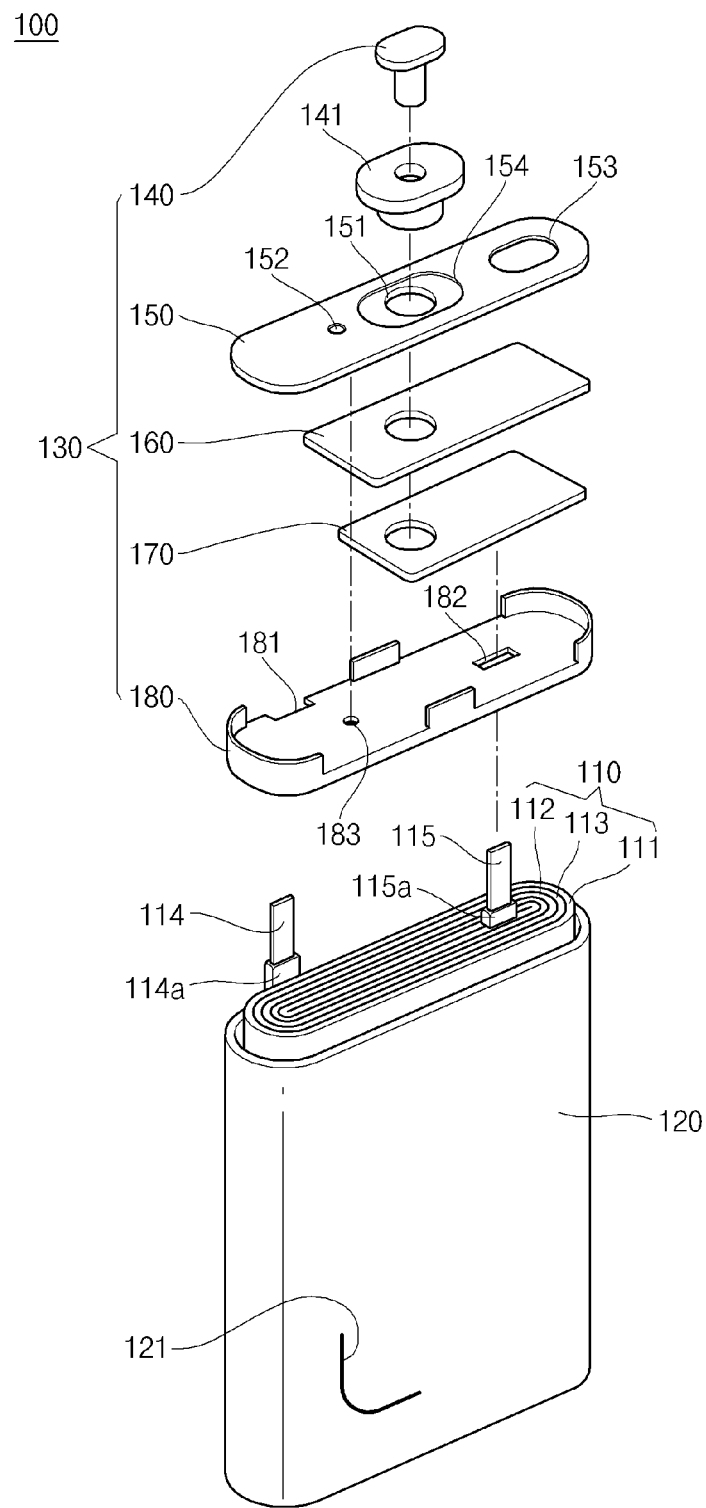
FIG. 1 is an exploded perspective view of a secondary battery according to an embodiment of the present invention.
Figure 2:
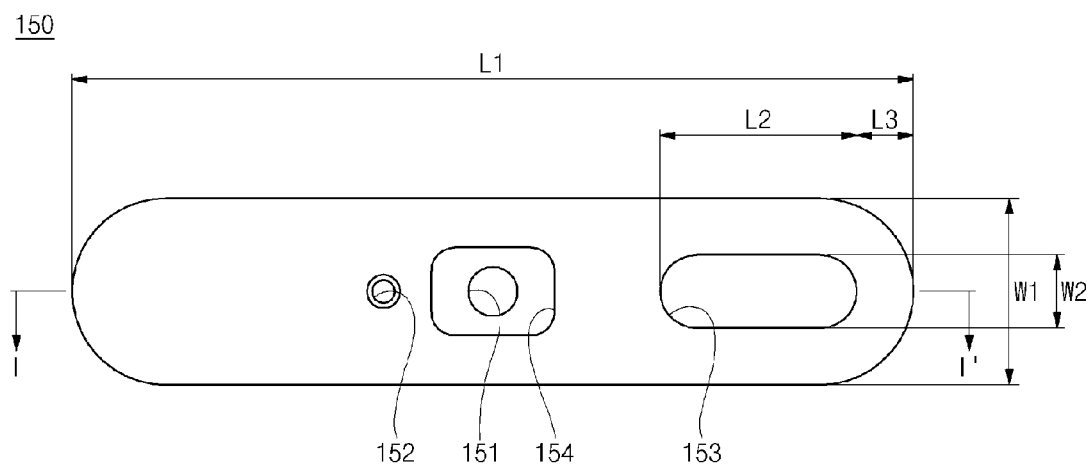
FIG. 2 is a plan view of a cap plate shown in FIG. 1.
Figure 3:
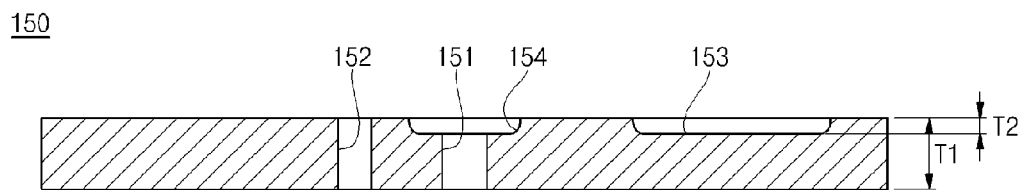
FIG. 3 is a cross-sectional view taken along the line I-I' of FIG. 2.
Figure 4:
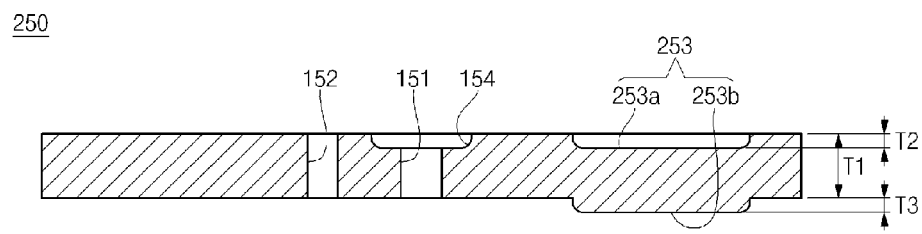
FIG. 4 is a cross-sectional view illustrating another embodiment of a reinforcement unit shown in FIG. 3.

FIG. 1 is an exploded perspective view of a secondary battery according to an embodiment of the present invention, FIG. 2 is a plan view of a cap plate shown in FIG. 1, FIG. 3 is a cross-sectional view taken along the line I-I' of FIG. 2, and FIG. 4 is a cross-sectional view illustrating another embodiment of a reinforcement unit shown in FIG. 3.

Referring to FIG. 1, the secondary battery 100 according to the embodiment of the present invention includes an electrode assembly 110, a can 120 and a cap assembly 130.

The electrode assembly 110 includes a first electrode plate 111 having a first active material coated on a surface of a first current collector, a second electrode plate 112 having a second active material coated on a surface of a second current collector, and a separator 113 interposed between the first electrode plate 111 and the second electrode plate 112 and electrically insulating the first electrode plate 111 and the second electrode plate 112 from each other. The electrode assembly 110 may include the first electrode plate 111, the second electrode plate 112 and the separator 113 wound in a jelly-roll configuration. Here, the first electrode plate 111 may be made of an aluminum (Al) foil, the second electrode plate 112 may be made of a copper (Cu) foil, and the separator 113 may be made of polyethylene (PE) or polypropylene (PP), but not limited thereto. In addition, a first electrode tab 114 is coupled to the first electrode plate 111 and protrudes to a top end of the electrode assembly 110, and a second electrode tab 115 is coupled to the second electrode plate 112 and protrudes to the top end of the electrode assembly 110. Insulation members 114a and 115a are attached to the first electrode tab 114 and the second electrode tab 115, thereby preventing short circuits from being caused between the first electrode tab 114 and the second electrode plate 112 and between the second electrode tab 115 and the first electrode plate 111.

The can 120 is shaped of a substantially hexahedral box having a top opening to accommodate the electrode assembly 110. In addition, the can 120 is formed by deep drawing and is made of a light, ductile conductive metal such as aluminum or an aluminum alloy. Further, the inner surface of the can 120 may be treated to be insulated from the electrode assembly 110. Here, the can 120 may have a polarity, for example, a positive polarity. In addition, a safety vent 121 is formed on an outer surface of the can 120. The safety vent 121 is configured to be mechanically weaker than other parts around the safety vent 121. Therefore, the safety vent 121 is ruptured to release the internal gas generated when the internal gas is generated in the can 120 due to abnormality of the electrode assembly 110. In addition, the safety vent 121 is preferably formed on a long side surface of the can 120, which is easily swollen when the internal gas is generated in the can 120. In the illustrated embodiment, the safety vent 121 having an "L" shape is exemplified. However, the safety vent 121 may have any shape as long as it can rupture the can 120 when the internal gas is generated in the can 120.

The cap assembly 130 is coupled to the top end of the can 120. The cap assembly 130 includes an electrode terminal 140, a cap plate 150, an insulation plate 160, a terminal plate 170 and an insulation case 180.

The electrode terminal 140 is coupled to the center of the cap plate 150. The electrode terminal 140 passes through the cap plate 150 to be electrically connected to the terminal plate 170. Here, a gasket 141 is formed between the electrode terminal 140 and the cap plate 150, thereby insulating the electrode terminal 140 and the cap plate 150 from each other.

The cap plate 150 seals the top end of the can 120 and is a substantially planar plate. A terminal hole 151, through which the electrode terminal 140 passes and to be coupled thereto, is formed at the center of the cap plate 150. In addition, an electrolyte injection hole 152 for injecting an electrolytic solution is formed in the cap plate 150. Once the electrolytic solution is formed, a plug (not shown) is installed in the electrolyte injection hole 152 to seal the electrolyte injection hole 152. In addition, a weakened portion 154 that can comprise a brittle part, is formed around the terminal hole 151. The weakened portion 154 is configured to be mechanically weaker than other parts around the weakened portion 154 and is in the form of a groove formed around the terminal hole 151. During a longitudinal compression test of the secondary battery 100, the weakened portion 154 causes the secondary battery 100 to be deformed. That is to say, during the longitudinal compression test, the secondary battery 100 is folded about the weakened portion 154. In addition, the electrode terminal 140 is mounted in the weakened portion 154 together with the gasket 141. In addition, a reinforcement unit 153 is formed at one side of the cap plate 150. The reinforcement unit 153 will later be described in detail.

An insulation plate 160 and a terminal plate 170 are sequentially formed under the cap plate 150. The insulation plate 160 insulates the cap plate 150 and the terminal plate 170 from each other. The terminal plate 170 is electrically connected to the electrode terminal 140. In addition, the terminal plate 170 is electrically connected to the second electrode tab 115.

The insulation case 180 is made of a polymer resin having an insulating property, for example, polypropylene. The insulation case 180 is formed between the cap plate 150 and the electrode assembly 110. Holes 181 and 182 are formed in the insulation case 180 to allow the first electrode tab 114 and the second electrode tab 115 to pass therethrough. In addition, an electrolyte passing hole 183 is formed in the insulation case 180 to be located to correspond to the electrolyte injection hole 152.

Next, a reinforcement unit formed in the cap plate will be described in detail.

Referring to FIGS. 2 and 3, the reinforcement unit 153 is formed at one side of the cap plate 150 for the purpose of reinforcing strength of the cap plate 150.

In general, during the longitudinal compression test of the secondary battery 100, a force is applied to the center from both sides of the can 120. Here, since the weakened portion 154, which is weaker in strength than other peripheral parts, is formed at the center of the cap plate 150, the secondary battery 100 is bent about the weakened portion 154, so that the terminal plate 170 and the can 120 are short-circuited to cause a current discharge, thereby preventing ignition and explosion of the secondary battery 100 due to over-heat of the electrode assembly 110. However, during the longitudinal compression test of the secondary battery 100, before the terminal plate 170 and the can 120 are short-circuited, both sides of the cap plate 150 are first deformed due to the force applied from the both sides of the can 120. Therefore, since the short circuit between the terminal plate 170 and the can 120 is not properly caused, the secondary battery 100 may be put into a dangerous condition, such as ignition and explosion. Accordingly, in these embodiments the strength of the both sides of the cap plate 150 is reinforced to cause a short circuit between the terminal plate 170 and the can 120 during the longitudinal compression test, thereby improving the safety of the secondary battery 100 by facilitating a current discharge.

The reinforcement unit 153 is shaped of a substantially oval groove formed on the top surface of the cap plate 150. Here, the reinforcement unit 153 may have various shapes, including a rectangle, a circle, a polygon, and so on. However, the reinforcement unit 153 is preferably shaped to fit and correspond to one end of the cap plate 150. In the illustrated embodiment, since the one end of the cap plate 150 is made to be round, the reinforcement unit 153 is also shaped to fit and correspond to the one end of the cap plate 150.

In addition, a ratio of a horizontal length L2 of the reinforcement unit 153 to a horizontal length L1 of the cap plate 150 is approximately 1:2 to 1:20 and possibly 1:5 (that is, L2:L1=1:5). For example, assuming that the horizontal length L1 of the cap plate 150 is 50 mm, the horizontal length L2 of the reinforcement unit 153 may be approximately 10 mm. In addition, the horizontal length L2 of the reinforcement unit 153 and the horizontal length L1 of the cap plate L1 may be in a range of 5% to 50%, and possibly 20%. Here, if the length L2 of the reinforcement unit 153 is less than 5% of the length L1 of the cap plate 150, the strength of the cap plate 150 is not sufficiently improved, so that the end of the cap plate 150 is first deformed during the longitudinal compression test. In addition, if the length L2 of the reinforcement unit 153 is greater than 50% of the length L1 of the cap plate 150, the reinforcement unit 153 may overlap with the electrolyte injection hole 152 formed between the terminal hole 151 and the reinforcement unit 153, making it difficult to inject an electrolytic solution into the electrolyte injection hole 152.

In addition, the reinforcement unit 153 is spaced a predetermined distance apart from the end of the cap plate 150.

In detail, a distance L3 ranging from the end of the cap plate 150 to a starting point of the end of the reinforcement unit 153 is approximately 5-15% of the horizontal length L1 of the cap plate 150, preferably 10%.

In addition, a ratio of a width W2 of the reinforcement unit 153 to a width W1 of the cap plate 150 may be 1:2 to 1:20 and possibly 1:2.64 (that is, W2:W1=1:2.64). For example, assuming that the width W1 of the cap plate 150 is 4.22 mm, the width W2 of the reinforcement unit 153 may be approximately 1.6 mm. In addition, the width W2 of the reinforcement unit 153 may be in a range of 5% to 50%, preferably 38%. Here, if the width W2 of the reinforcement unit 153 is less than 5% of the width W1 of the cap plate 150, the strength of the cap plate 150 is not sufficiently improved, so that the end of the cap plate 150 is first deformed during the longitudinal compression test. In addition, if the width W2 of the reinforcement unit 153 is greater than 50% of the width W1 of the cap plate 150, it is difficult to tightly fix the cap plate 150 to the can 120.

Further, the reinforcement unit 153 is formed as a groove formed on the top surface of the cap plate 150. Meanwhile, a ratio of a thickness T2 of the groove to a thickness T1 of the cap plate 150 may be 1:1.25 to 1:10 and possibly 1:2.5 (that is, T2:T1=1:2.5). For example, assuming that the thickness T1 of the cap plate is 1 mm, the thickness T2 of the groove may be approximately 0.4 mm.

As described above, in the secondary battery 100 according to the embodiment of the present invention, the reinforcement unit 153 is formed at one side of the cap plate 150, thereby preventing the end of the cap plate 150 from being first deformed during a longitudinal compression test. Therefore, the secondary battery 100 according to the embodiment of the present invention causes a short circuit between the terminal plate 170 and the can 120 during the longitudinal compression test to facilitate a current discharge, thereby improving the safety of the secondary battery 100.

FIG. 4 is a cross-sectional view illustrating another embodiment of the reinforcement unit shown in FIG. 3.

Referring to FIG. 4, the cap plate 250 includes a centrally formed terminal hole 151, an electrolyte injection hole 152 through which an electrolytic solution is injected, a weakened portion 154 formed around the terminal hole 151, and a reinforcement unit 253 formed at one side of the cap plate 150.

The reinforcement unit 253 is formed at one side of the cap plate 250 for the purpose of increasing the strength of the cap plate 250. The reinforcement unit 253 includes a groove 253*a* formed on a top surface of the cap plate 250 and a protrusion part 253*b* formed on a bottom surface of the cap plate 250. That is to say, the reinforcement unit 253 further includes the protrusion part 253*b* protruding to the bottom surface of the cap plate 250, compared to the reinforcement unit 153 shown in FIG. 3. The protrusion part 253*b* may protrude to the bottom surface of the cap plate 250 as much as a thickness T2 of the groove 253*a*. That is to say, the thickness T2 of the groove 253*a* may be equal to a thickness T3 of the protrusion part 253*b* (that is, T2=T3). That is to say, the groove 253*a* is formed on the top surface of the cap plate 250 and the protrusion part 253*b* is formed on the bottom surface of the cap plate 250 by pressing the top surface of the cap plate 250 using a pressing device in the course of forming the reinforcement unit 253.

Figure 5:
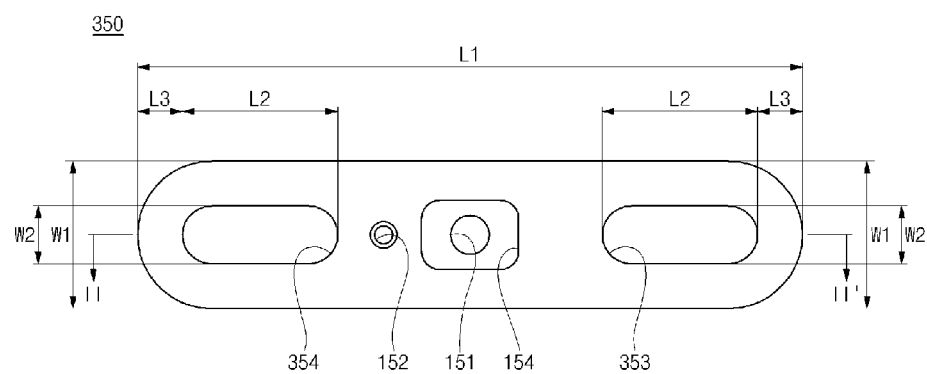
FIG. 5 is a cross-sectional view illustrating a cap plate having a reinforcement unit according to still another embodiment of the present invention.
Figure 6:
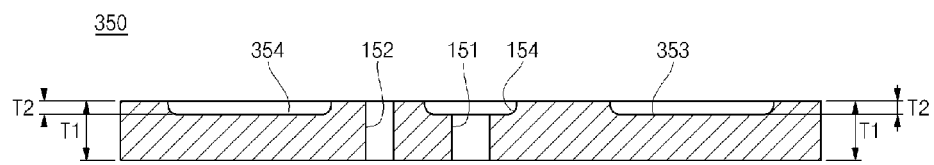
FIG. 6 is a cross-sectional view taken along the line II-II' of FIG. 5.

FIG. 5 is a cross-sectional view illustrating a cap plate having a reinforcement unit according to still another embodiment of the present invention and FIG. 6 is a cross-sectional view taken along the line II-II' of FIG. 5.

Referring to FIGS. 5 and 6, the cap plate 350 includes a centrally formed terminal hole 151, an electrolyte injection hole 152 through which an electrolytic solution is injected, a weakened portion 154 formed around the terminal hole 151, and reinforcement units 353 and 354 formed at both sides of the cap plate 350. That is to say, the reinforcement units 353 and 354 are different from the reinforcement unit 153 shown in FIG. 3 in that they are formed at both sides of the cap plate 350. Here, since a force is applied from both sides of a can 120 during a longitudinal compression test, the reinforcement units 353 and 354 are preferably formed at both sides of the cap plate 350.

The reinforcement units 353 and 354 include a first reinforcement unit 353 formed at one side of the cap plate 350 and a second reinforcement unit 354 formed at the other side of the cap plate 350. The first reinforcement unit 353 and the second reinforcement unit 354 are groves formed on a top surface of the cap plate 350, the grooves having substantially oval shapes. Since the first reinforcement unit 353 is substantially the same as the reinforcement unit 153 shown in FIG. 3 in view of configuration, a detailed description thereof will not be given.

The second reinforcement unit 354 is formed to have the same configuration with the first reinforcement unit 353. In addition, the first reinforcement unit 353 and the second reinforcement unit 354 are positioned symmetrically with respect to the center of the cap plate 350. Therefore, length, width and thickness ratios of the second reinforcement unit 354 and the cap plate 350 are the same as described above. That is to say, a ratio of a horizontal length L2 of the second reinforcement unit 354 to a horizontal length L1 of the cap plate 350 is approximately 1:2 to 1:20 and possibly 1:5 (that is, L2:L1=1:5). In addition, the horizontal length L2 of the second reinforcement unit 354 may be in a range of approximately 5% to 20% (that is, L2:L1=1:5), preferably 20%. In addition, the second reinforcement unit 354 is spaced apart from the other end of the cap plate 350. In detail, a distance L3 between the cap plate 350 and the second reinforcement unit 354 is 10% of the horizontal length L1 of the cap plate 350. In addition, a ratio of a width W2 of the second reinforcement unit to the width W1 of the cap plate 350 is approximately 1:2 to 1:20 and possibly 1:2.64 (that is, W2:W1=1:2.64). Further, the second reinforcement unit 354 is shaped of a groove formed on a top surface of the cap plate 350. A ratio of a thickness T2 of the groove to a thickness T1 of the cap plate 350 is approximately 1:1.25 to 1:10 and possibly 1:2.5 (that is, T2:T1=1.2.5).

Figure 7:
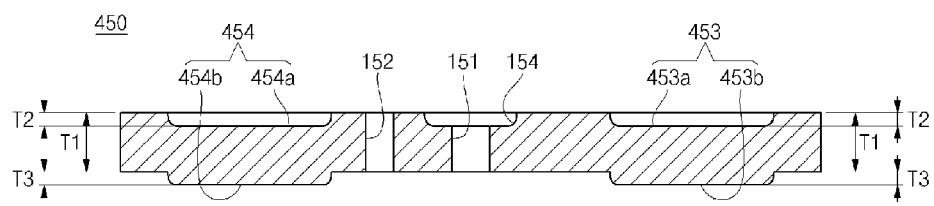
FIG. 7 is a cross-sectional view illustrating a cap plate having a reinforcement unit according to still another embodiment of the present invention.

FIG. 7 is a cross-sectional view illustrating a cap plate having a reinforcement unit according to still another embodiment of the present invention.

Referring to FIG. 7, the cap plate 450 includes a centrally formed terminal hole 151, an electrolyte injection hole 152 through which an electrolytic solution is injected, a weakened portion 154 formed around the terminal hole 151, and reinforcement units 453 and 454 formed at both sides of the cap plate 450.

The reinforcement units 453 and 454 include a first reinforcement unit 453 formed at one side of the cap plate 450 and a second reinforcement unit 454 formed at the other side of the cap plate 450. In addition, the first reinforcement unit 453 includes a groove 453a formed on a top surface of the cap plate 450 and a protrusion part 453b formed on a bottom surface of the cap plate 450. The second reinforcement unit 454 includes a groove 454a formed on a top surface of the cap plate 450 and a protrusion part 454b formed on a bottom surface of the cap plate 450. That is to say, the reinforcement units 453 and 454 are different from the reinforcement units 353 and 354 shown in FIG. 6 in that they further include the protrusion parts 453b and 454b protruding to the bottom surface of the cap plate 450. That is to say, a thickness T3 of the protrusion part 453 may be equal to a thickness T2 of the groove formed on the top surface of the cap plate 450 (that is, T3=T2).

Figure 8:
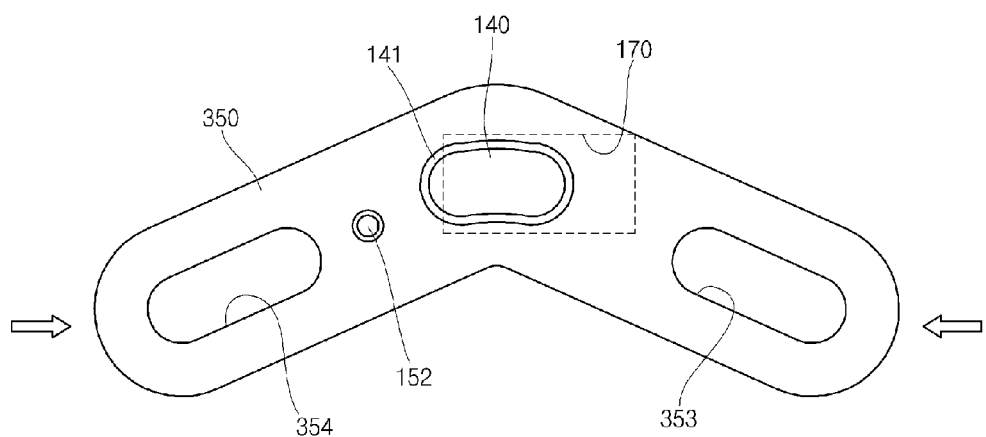
FIG. 8 is a plan view illustrating an appearance of the secondary battery during a longitudinal compression test.

FIG. 8 is a plan view illustrating an appearance of the secondary battery during a longitudinal compression test.

As shown in FIG. 8, if a force is applied to the center of a can 120 from both sides of the can 120 during a longitudinal compression test of a secondary battery 100, the secondary battery 100 undergoes a current discharge while it is bent about the weakened portion 154 formed at the center of the cap plate 350 to cause a short circuit between a terminal plate 170 and the can 120. Therefore, it is possible to prevent ignition or explosion from occurring to the secondary battery 100 due to over-heating of an electrode assembly 110. Here, since the weakened portion 154 is formed at the center of the cap plate 350, the can 120 is bent about the center of the cap plate 350 during the longitudinal compression test. In addition, in the secondary battery 100 according to the embodiment of the present invention, the reinforcement units 353 and 354 are formed at both sides of the cap plate 350, thereby preventing the both sides of the cap plate 350 from being deformed due to the force applied to the both sides of the cap plate 350 during the longitudinal compression test. Therefore, the secondary battery 100 according to the embodiment of the present invention causes a short circuit between the terminal plate 170 and the can 120 during the longitudinal compression test to facilitate a current discharge by reinforcing the strength at both sides of the cap plate 350, thereby improving the safety of the secondary battery 100.

Figure 9:
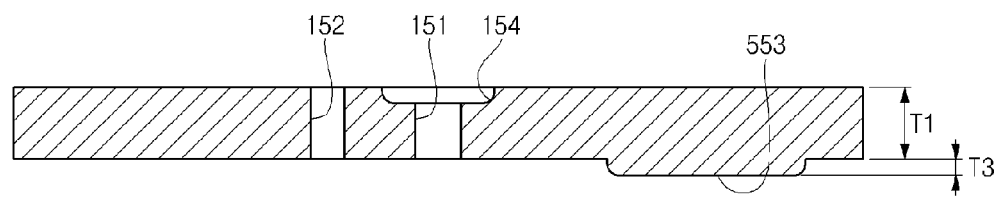
FIG. 9 is a cross-sectional view illustrating another embodiment of the cap plate of a secondary battery.

The previously described embodiments disclose reinforcing units comprising grooves on one side which can be accompanied by a corresponding protrusion on the other side. As is shown in the embodiment illustrated in FIG. 9, the reinforcing unit 553 can comprise a protrusion formed on one side of the cap plate 550 without a corresponding groove. The protrusion 553 is shown on a bottom side of the cap plate 550, but can be formed on the top portion as well. As shown, the cap plate 550 in this embodiment includes a weakened portion 154 that functions in substantially the same way as the portions described above.

Although the secondary batteries according to exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A secondary battery comprising:
an electrode assembly having a first electrode terminal;
a can that receives the electrode assembly;
a cap plate having ends and side walls interconnecting the ends and coupled to the can so as to seal the electrode assembly within the can, wherein the cap plate defines a longitudinal axis and wherein the cap plate includes at least one reinforcing element that is dimensioned and located on the cap plate so that the can deforms about a first point in response to compressive forces exerted in the direction of the longitudinal axis of the cap plate wherein the reinforcing element comprises at least one groove that has exposed side walls and an exposed bottom surface and a shape that corresponds to the shape of an end of the cap plate wherein the thickness of the cap plate in the groove is substantially constant over the surface area of the groove and wherein a weakened portion is formed on the cap plate in a first location so as to define the first point and wherein the weakened portion comprises a portion of the cap plate of reduced thickness and wherein the first electrode terminal extends through the cap plate in the weakened portion and is electrically isolated from the cap plate and wherein the reinforcing element and the weakened portion of the cap plate are spaced from each other with the reinforcing element being spaced between the weakened portion and at least one of the ends of the cap plate.

2. The secondary battery of claim 1, further comprising a terminal plate that is positioned between the cap plate and the can and wherein the first point is selected so that deformation of the cap plate about the first point results in the terminal plate short circuiting with the can.

3. The secondary battery of claim 1, wherein the cap plate includes a first and second surface and wherein the reinforcing element comprises at least one groove formed on the cap plate located to one side of the first point along the longitudinal axis of the cap plate.

4. The secondary battery of claim 3, wherein the at least one groove comprises a first and a second groove located on opposite sides of the first point along the longitudinal axis of the cap plate.

5. The secondary battery of claim 3, further comprising a protrusion part that is positioned on the surface of the cap plate opposite the groove.

6. The secondary battery of claim 5, wherein the protrusion part protrudes outward from the surface the same amount as the groove extends into the cap plate and has substantially the same contour as the at least one groove.

7. The secondary battery of claim 1, wherein the at least one reinforcing element comprises a first and a second reinforcing element that are arranged on opposite sides of the first point along the longitudinal axis of the cap plate.

8. The secondary battery of claim 7, wherein the first and second reinforcing elements are symmetrical about the first point.

9. The secondary battery of claim 1, wherein a ratio of a horizontal length of the reinforcement element to a horizontal length of the cap plate is between the ratios of 1:2 to 1:20 wherein the horizontal length is in a direction that is parallel to the longitudinal axis.

10. The secondary battery of claim 1, wherein a horizontal length of the reinforcement element is 5% to 50% of a horizontal length of the cap plate.

11. The secondary battery of claim 1, wherein a ratio of a width of the reinforcement element to a width of the cap plate is between the ratios of 1:2 to 1:20 wherein the width is in a direction that is perpendicular to the longitudinal axis.

12. The secondary battery of claim 1, wherein a width of the reinforcement element is 5% to 50% of a width of the cap plate.

13. The secondary battery of claim 1, wherein a ratio of the vertical size of the of the reinforcement element to a thickness of the cap plate is between the ratios of 1:1.25 to 1:10.

14. The secondary battery of claim 1, wherein the reinforcement element is spaced apart from an end of the cap plate, and a distance between the cap plate and the reinforcement element is 5% to 15% of the horizontal length of the cap plate.

15. The secondary battery of claim 1, further comprising a safety vent formed in the can.

16. The secondary battery of claim 1, wherein the reinforcing element reinforces the strength of the cap plate by inhibiting at least one side of the cap plate from being deformed due to a force applied from both sides of the can along the longitudinal axis of the cap plate.

17. The secondary battery of claim 1, wherein the at least one reinforcement member comprises a protrusion.

18. The secondary battery of claim 1, wherein the first point is positioned at the center point of the longitudinal axis of the cap plate.

* * * * *